April 9, 1946.  R. CHILTON  2,398,208

TRANSMISSION

Filed March 29, 1943  4 Sheets-Sheet 1

INVENTOR
ROLAND CHILTON.
BY
ATTORNEY

April 9, 1946.   R. CHILTON   2,398,208
TRANSMISSION
Filed March 29, 1943   4 Sheets-Sheet 2
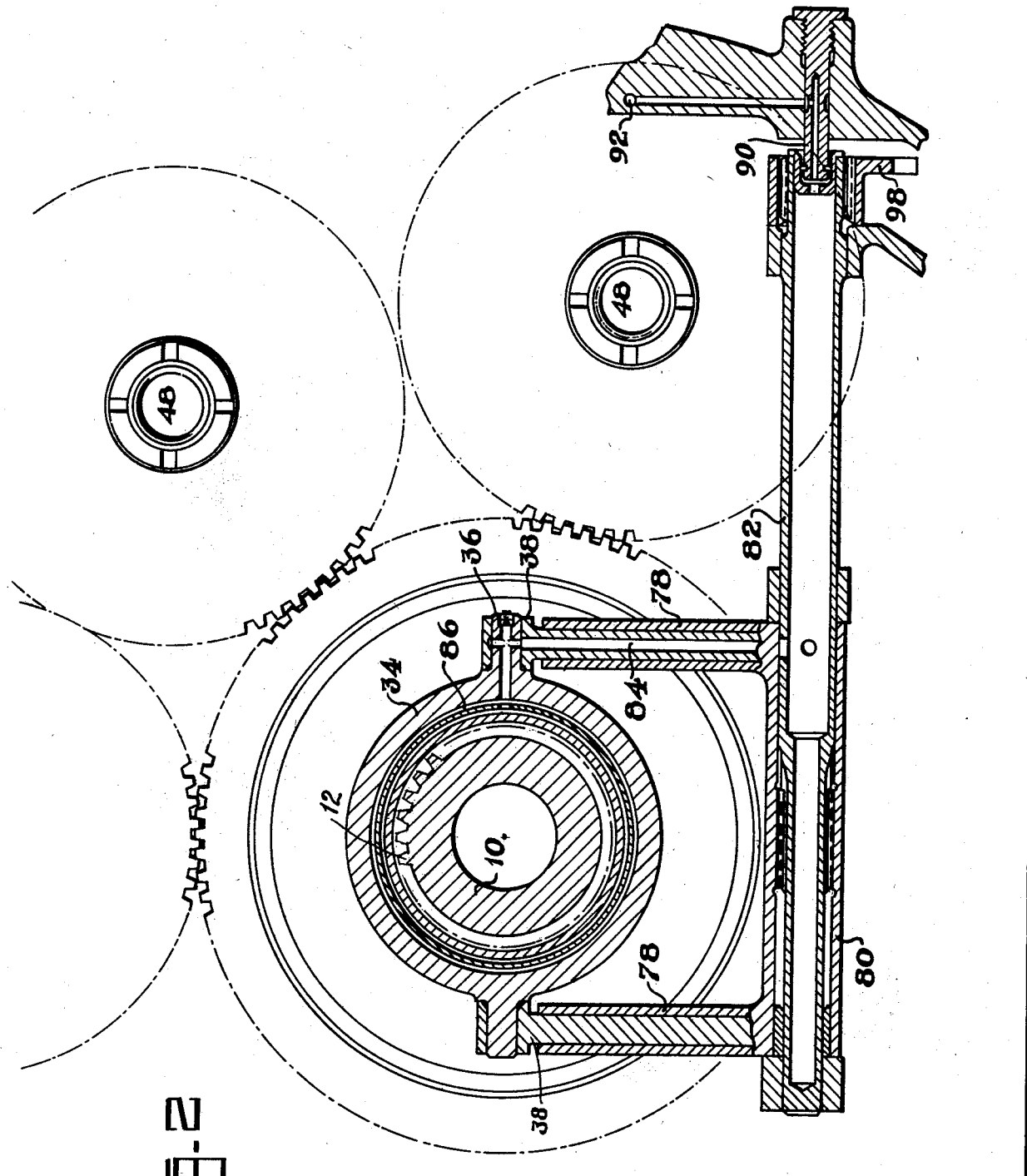
INVENTOR
ROLAND CHILTON.
BY
ATTORNEY April 9, 1946.　　　　　R. CHILTON　　　　　2,398,208
TRANSMISSION
Filed March 29, 1943　　　4 Sheets-Sheet 3
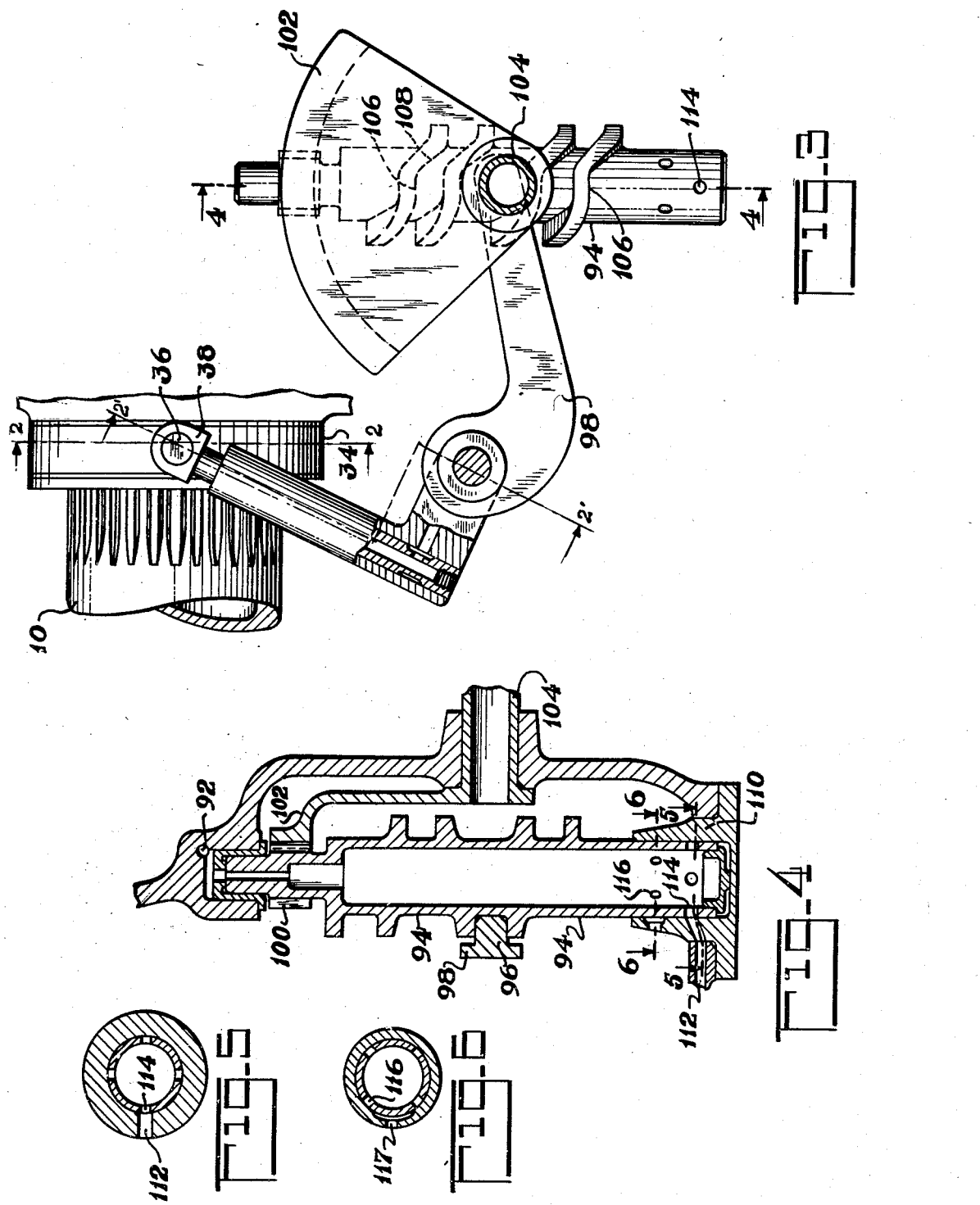
INVENTOR
ROLAND CHILTON.
BY
ATTORNEY April 9, 1946. R. CHILTON 2,398,208
TRANSMISSION
Filed March 29, 1943 4 Sheets-Sheet 4

INVENTOR
ROLAND CHILTON.
BY
ATTORNEY

Patented Apr. 9, 1946

2,398,208

UNITED STATES PATENT OFFICE 2,398,208

TRANSMISSION

Roland Chilton, Ridgewood, N. J., assignor to Wright Aeronautical Corporation, a corporation of New York Application March 29, 1943, Serial No. 481,033

26 Claims. (Cl. 192—3.5)

This invention comprises improvements in multi-speed transmissions for all purposes, the design represented by the drawings being for a tank transmission embodying seven speeds, and it is a feature of the invention that it is adaptable to any number of speeds with only minor changes in the internal arrangement and length.

A prime object of the invention is to provide for extremely fast shifting from one gear to the next to overcome one of the difficulties found in tanks and in heavy automotive equipment using conventional "synchro-mesh" shift as follows: These devices absorb a definite time interval to produce synchronization which prevents rapid shifting and causes a relatively long power-off interval, which is particularly objectionable between the lower gears. Thus it will happen that a vehicle capable of negotiating a hill or heavy terrain in second gear must be kept in first gear because the heavy vehicle acquires little momentum in first gear and stalls in the power-off shift interval before second gear can be engaged. This quick-shifting objective of this invention is in part obtained by a novel dual clutch organization later to be described. The special provisions are designed with the intention of providing such rapid shifting and such clutch performance that the shift will be so rapid as to be made at full throttle, that is, without relaxing the accelerator pedal as usual in a conventional transmission. It is contemplated that a full-throttle shift will not result in excessive engine speed in virtue of the extreme rapidity of shift. As will be obvious from the later description, one clutch element may be regarded as a synchro-mesh device but, in this case, it is one having capacity to transmit the entire engine torque as compared to the small fraction thereof which is within the capabilities of the conventional synchronizing means.

Another object of the invention is to provide a transmission of many speeds wherein the gearing subtends a minimum length, thus simplifying the construction, reducing the weight and bulk, and eliminating the necessity for intermediate shaft bearings, and providing a basic design readily adaptable to a large number of speeds.

Other objects of the invention will be pointed out in or will be obvious from the following description with reference to the drawings, in which:

Fig. 1 is a one-half longitudinal section through the transmission;

Fig. 2 is a composite sectional view taken along the lines 2—2 and 2'—2' of Figs. 1 and 3;

Fig. 3 is a side view of a shift cam and lever with a fragmentary section;

Fig. 4 is an axial section on the line 4—4 of Fig. 3;

Figs. 5 and 6 are end sections of an oil control valve incorporated in the cam.

Figure 1:
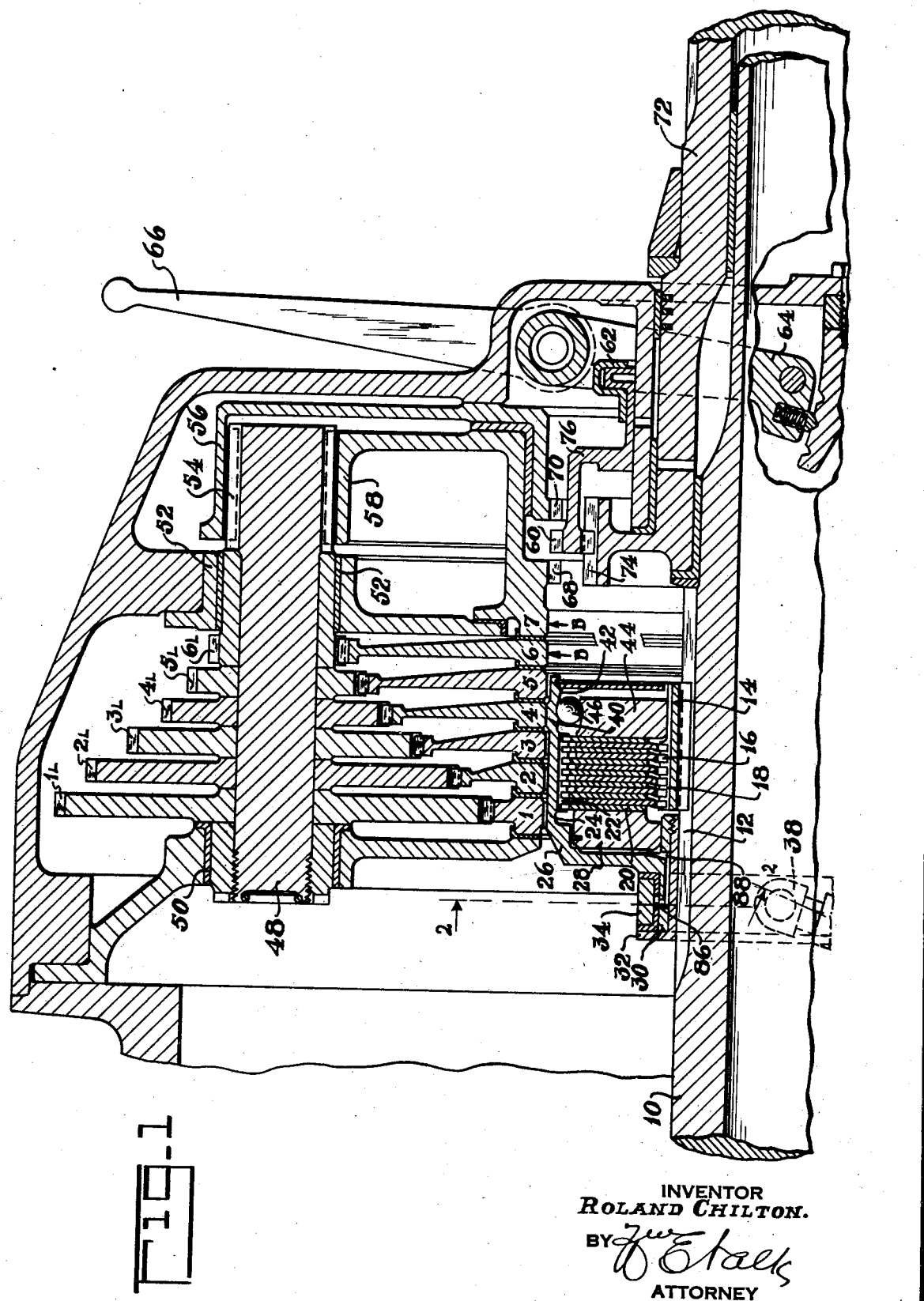

Referring first to Fig. 1, 10 represents the input shaft of the transmission which may be the crankshaft of an associated engine. The shaft 10 is equipped with splines 12 on which is slidable an inner clutch member 14 provided also with external splines 18 on which are mounted clutch plates 16 of a multiple disc clutch. Intermediate the clutch plates 16 are outer clutch plates 20 having external splines engaged with splines 22 formed in an outer drum 24 having an end plate 26 which also comprises a hydraulic cylinder for a clutch applying piston 28. The plate 26 has an extension 30 equipped with a thrust flange 32 and engaging a shift collar 34 having trunnions 36 (see also Fig. 2) engaged by shifting arms 38 cooperating with shift mechanism later to be described.

Surrounding and concentric with the clutch mechanism just described are a series of gears 1, 2, 3, 4, 5 and 6, and a direct drive gear 7. All of these gears have bores of the same diameter as indicated by B for gears numbered 6 and 7. At the righthand end of the clutch drum 24, there is a circumferential clutching land or surface 40 which, as fabricated, has an outside diameter which is a close running fit so as to be slidable through the bores of the gears from one to another. Beneath this clutching land the drum 24 has a conical inner surface 42 and a corresponding cone is formed on the circumference of a heavy reaction plate 44; balls 46 being interposed so that should the reaction or wedge member 44 be pressed to the right, the balls 46 comprise an anti-friction means exerting a relatively great bursting pressure on the drum 24 beneath the clutching land 40. It will be seen that should hydraulic pressure be admitted to the piston 28 this will engage the clutch plates 16 and 20 while the piston pressure reacts also on the reaction plate 44. The clutch drum 24 and its element 40 are relatively thin; so much so, in fact, that they might be overstressed if full hydraulic pressure should be applied to the assembly when the land 40 is not restrained by one of the gear bores to be engaged. Assuming, for example, that the land 40 was 8 inches in diameter, then at 60,000 pounds stress (for steel) the clutching land would expand $16/1000$". The clearance of the land 40 in its relaxed position from the bores B will be only a small fraction of this elastic expansive capacity so that in use, the bursting pressure on the land element 40 is resisted by the engaged gear thus comprising a radially expanding clutch of relatively small surface and therefore suited only for slight slippage. If greater flexibility is desired, the clutch drum 24 may be axially slotted at the clutch land 40 as in conventional expanding collets. While the clutch ring element 40 is so thin as to be unable of itself to resist the bursting force from the balls 46, yet it will be seen that each of the engaged gears 1, 2, 3, 4, 5, 6, and 7 is a relatively massive member able to resist substantial expansion. The multiple clutch plates 16 and 20 have a relatively great aggregate surface suited for durability under substantial slipping. The angle of the coned surfaces engaged by the expanding balls 46, and the number and relative diameter of the clutch plates is so proportioned that the torque capacity of the expanding clutch 40 is substantially in excess of that of the slippable clutch plates 16 and 20. However, both elements are subject to a common primary actuating force, i. e., the oil pressure on the piston 28, so that it should be obvious that, when such pressure is applied, the expanding clutch element 40 will clutch the appropriate gear with sufficient power to cause the slippage to occur almost exclusively at the clutch plates. Actually, the small amount of slippage at the expanding clutch will depend on the inertia of the drum 24, 26 and the associated clutch plates 20, and it is a feature of this invention that these parts possess very little inertia compared to conventional automotive clutches usually comprising a single plate necessarily requiring relatively great diameter and flywheel effect. It is intended that the slippage of the circumferential clutch surface 40 when the selected gear is engaged, will for this reason only be a small fraction of a revolution leaving the plate clutch to take the many revolutions of slip necessary for a gear shift. This result is achieved by having the expanding clutch of predominating torque capacity and light weight. It will be seen that this clutch has only to accelerate the elements 24, 26 and 20 whereas the large surface multiple plate clutch has to accelerate the entire vehicle or decelerate the entire engine, as the case may be.

As described the clutch 40 can transmit considerably more torque without slipping than the multiple plate clutch 16, 20. In addition, as compared to the clutch 40, the plate clutch 16, 20 is capable of withstanding considerably more slipping without damage to the clutch. Accordingly, the clutch 40 may be described as having a relatively large torque capacity and the plate clutch 16, 20 as having relatively large slippage capacity.

In conventional gear shift transmissions, multiple plate clutches such as the clutch 16, 20 have, in general, been abandoned in favor of single plate clutches because the multiple arrangement, although much lighter and more compact, gives difficulties due to residual drag in the disengaged position, which interferes with silent gear shifting. This limitation, however, is of no moment in the present invention where the actual engagement and disengagement is affected by the expansion and contraction of the smooth circular clutch element 40, which is in series with the multiple plate clutch wherein very slight contraction will completely disengage the clutch assembly from the gears for free shifting, as later to be described.

Surrounding the gears 1, 2, 3, 4, 5, 6, and 7 are a plurality of layshafts 48 supported in suitable bearings 50 and 52 and rigidly carrying a plurality of various diameter layshaft gears 1L, 2L, 3L, 4L, 5L, and 6L, constantly meshed with the respective gears 1, 2, 3, 4, 5 and 6 to drive each at correspondingly varying speed ratios. The layshafts 48 have, at their right hand ends, pinions 54 meshed with an internal gear 56 and an external gear 58, these gears comprising driven members of the transmission; the gear 58 giving forward speeds and the gear 56 reverse speeds of slightly greater reduction ratio. The forward and reverse drives are selected by a toothed clutch 60 slidable by means of a shift collar 62 and lever 64 operated by the hand lever 66. By this means the toothed clutch 60 can be selectively engaged with companion teeth 68 and 70 in the gears 58 and 56 respectively. The final drive or output shaft of the transmission 72 is equipped at its inner end with splines 74 engaging companion splines cut beneath the splines 60 in the reverse selector member 76.

The shifting functions operate as follows: First, referring to Figs. 2 and 3, where it is seen that the shifting arms 38 which, as previously described, engage the trunnions 36 in the shift collar 34, are telescoped within respective arms 78 comprising, with the hub 80, a forked shift-lever actuated by a rock-shaft 82. One or both of the arms 38 is provided with an oil duct 84 communicating with the inside of the hollow shaft 82 and through the hollow trunnions 36 to an annulus 86 in the shift collar 34. Suitable holes and slots indicated at 88, Fig. 1, convey the actuating oil pressure to the piston 28 which actuates the compound clutch. At its right hand end, the rock-shaft 82 is engaged by an oil conveying stub 90 which, in turn, communicates with a duct 92, Fig. 2. The other end of this duct is seen at 92 in Fig. 4 as communicating with the interior of a hollow shifting cam 94 seen also in outside view in Fig. 3. This cam is engaged by a stud 96 at the end of a lever 98 seen in full view in Fig. 3 and rigid with the right-hand end of the rock-shaft 82, Fig. 2 (where only the hub of the lever 98 is seen). In other words, the shift-cam engaging lever 98 and the shift collar arms 38 swing rigidly with the rock-shaft 82.

At its upper end the cam 94 has a pinion 100 engaged by a gear quadrant 102 (Figs. 2 and 3) integral with a primary control shaft 104. This operating shaft 104 may be rocked by means of a conventional manual gear shift lever (not shown) or by any suitable automatic gear shift means. It will be seen that the cam 94, Fig. 3, consists of parallel elements 106 and inclined elements 108 so that while the cam moves through the arcs subtended by the parallel elements, the shift lever 98, and therefore the entire clutch assembly, is locked from axial motion. These parallel elements or dwells in the cam correspond to the various engaged positions of the expanding clutch 40 with the respective gears 1, 2, 3, 4, 5, 6 and 7.

At its lower end, the cam 94 engages a bearing 110 which also comprises an oil control valve as follows: Hydraulic pressure from an oil pump (not shown) is at all times applied to a duct 112 which cooperates with valve holes 114 formed in the journal of the cam 94 as seen in detail end section of Fig. 5. In the position shown, it may be observed that the interior of the cam is connected to pump-pressure which will devolve upon the clutch actuating piston 28 through the passages already described. To insure instantaneous and complete relief of clutch actuating pressure when the pressure hole 112 is closed by rotation of the cam, a second set of relief or dump holes 116 are provided along the line 6—6, Fig. 4, as seen in section in Fig. 6, which relief holes 116 are adapted to cooperate with the drain passage 117.

As disclosed, the cam 94 has the "dwell" elements 106 arranged at 90° intervals with the inclined elements 108 in between wherefore the cam will make one and one-half revolutions in moving from gear 1 to gear 7 (direct drive). The pressure control and dump valve holes 114 and 116 are also arranged at 90° spacings. It will now be seen that with the cam in the position shown, i. e., with the stub 96 of the lever 98 on the parallel or dwell portion of the cam, initial movement of the quadrant 102 will rotate the cam without moving the lever 98. This rotation cuts off the oil pressure to the clutches before the sloped element 108 of the cam starts to shift the clutch assembly axially towards the next gear. For the same reason, this shift movement ceases when the next "dwell" cam element is reached and the subsequent movement of the cam holds the lever 98 still while oil pressure is re-established by the valve holes 114. Recapitulating, the sequence on moving the primary control shaft 104 and quadrant 102 from any gear position to the next is: First the clutch oil pressure is shut off. Then the clutch assembly is shifted axially into alignment with the next gear and then the clutch oil pressure is re-established on the piston 28. It is intended in practice that this sequence, which first unloads the expanding clutch 40 and the plate clutch 16, 20, then moves the assembly to the adjacent gear and then re-expands the clutch 40 and loads the clutch 16, 20, can be performed with extreme rapidity since the shift is not delayed by synchronizing devices which conventionally prevent the completion of the shift motion until synchronization has occurred. In fact, it is intended that the interval between the disengagement of the expanding clutch 40 from one gear and its engagement to zero slip with the next gear will take place as fast as it will be possible for an operator to move a control lever. However, it must be remembered that after the expanding clutch 40 has gripped the engaged gear to zero slip, slippage will then continue at the plate clutch 16, 20 for whatever period of time is necessary to change the engine and/or the vehicle speed to the new ratio. This may take an appreciable time but the point is that during this slippage period of the main clutch, full engine torque is being applied to the vehicle so that the power-off interval of a shift will be merely that required to move the control lever for a small distance, which is in accordance with a prime objective of the invention.

The specific contact pressures of the expanding clutch 40 are very high in order to minimize the slippage at this point whereas the specific pressures at the main clutch plates themselves will be relatively low, in accordance with good practice for clutches which must sustain substantial slip. This pressure intensity ratio between the two clutches in the example shown will be of the order of 30/1 and it will be noted that this ratio obtains regardless of the actual load developed at any instant by the hydraulic clutch actuating piston 28.

Figure 7:
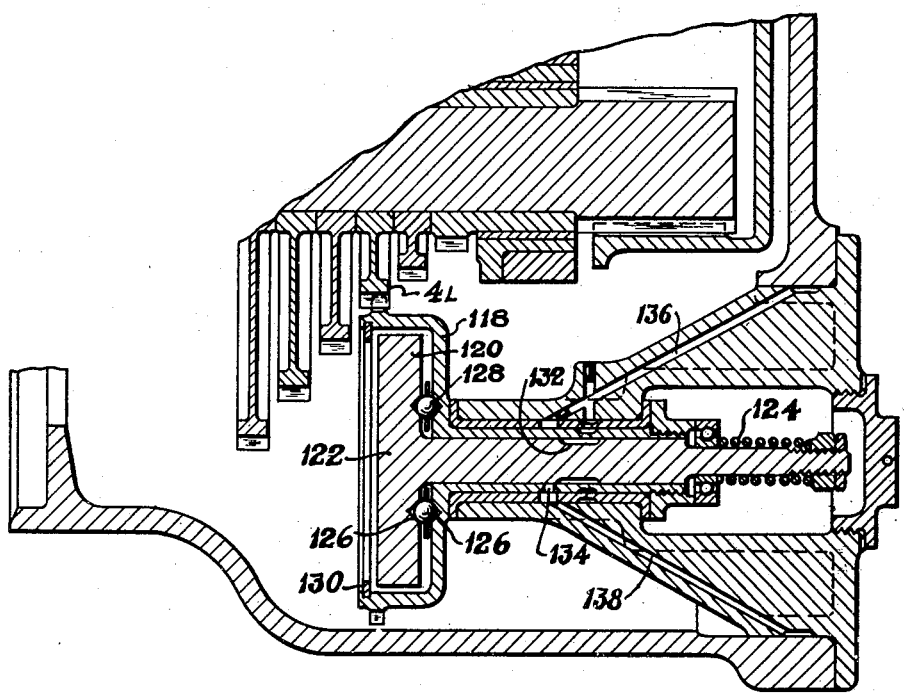
Fig. 7 is a fragmentary section showing an acceleration limiting device.

Referring now to Fig. 7, a clutch pressure regulating device is shown which reduces the hydraulic pressure on the clutch when excessive rates of acceleration of a driven shaft would otherwise occur. For this purpose one of the layshaft gears such as 4L is engaged by a hollow gear 118 which, accordingly, always runs at speed proportional to the driven shaft 72. Within the gear 118 is a flywheel or inertia member 120 having a shaft 122 loaded to the right by an adjustable spring 124. A circumferential plurality of opposed conical pockets 126 are formed in the hollow gear 118 and in the flywheel member 120 and engaged between these pockets are balls 128 which are, accordingly, subject to the axial pressure of the spring 124 and normally drive the inertia member 120 as a unit with the gear 118. However, should an excessive acceleration or deceleration of the driven shaft 72 (and therefore the gear 118) impend, the inertia member 120 will lag, causing rotation relative to the gear 118 and generating leftward axial movement of the mass 120 which is limited by a stop ring 130. At its mid-length the shaft 122 is provided with a valving neck 132 which upon leftward axial movement uncovers a pressure escape hole 134 thereby connecting the clutch oil pressure via passage 136 to the drain passage 138. That is, under excessive acceleration the aforementioned leftward movement of the inertia member 120 uncovers the pressure escape hole 134 to an extent determined by the acceleration, thereby reducing the hydraulic pressure on the clutch and limiting the maximum torque and acceleration which the clutch can produce, according to the adjustment of the spring 124.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a transmission, a drive shaft, several gears concentric therewith affording several speeds, said gears having identical clutching bores defining an axially laminate composite cylinder, a compound clutch assemblage slidable as a unit along said shaft, said compound clutch assemblage including a multiple plate clutch element, an element expansible into driving engagement selectively with the walls of any one of said gear bores, and a common means for loading both said clutch elements.

2. In a transmission, a shaft, a compound clutch assemblage slidable as a unit to different gear stations therealong and comprising a multiple plate clutch element and a circumferentially expansible friction clutch element arranged in series, a common loading means for said clutch elements, said expanding clutch means having greater clutching torque capacity than said multiple plate clutch means, and a series of gears of different speeds having bores, the walls of which are selectively clutchable by said expanding element.

3. In a transmission, a drive shaft, a compound clutching unit slidable thereon and comprising a cylindrical expansible clutching element and a multiple plate clutch element arranged in series and an hydraulic piston adapted to load both said elements, a plurality of gears selectively engageable by said expanding clutch element, and gear shift actuating means comprising a cam including hydraulic valving means and organized so that rotation of said cam from one gear shift position to the next first shuts off hydraulic pressure, then moves the clutch assemblage to the next gear position and then restores said hydraulic pressure.

4. In a transmission, a shift-cam having angular shift-producing segments interspaced with dwell segments producing no shift motion, a clutch shiftable by said cam and having hydraulic clutch loading means, and hydraulic pressure valving means operatively associated with said cam so as to cut off operating pressure from said clutch before shifting the same and to restore said pressure after a shift movement has been completed.

5. In a transmission having several gear stations, a shift-cam including inclined segments interspaced with dwell segments, a hydraulically operable clutch, means for shifting said clutch from said cam, said cam including valving holes adapted when said cam is moved from one dwell segment to the next to first cut off hydraulic pressure from said clutch and then shift said clutch to an adjacent gear station and then restore hydraulic pressure, and a plurality of gears selectively engageable by said clutch at respective stations.

6. In a transmission, in combination, concentric gears affording different speeds arranged side-by-side with bores in said gears collectively comprising a composite cylinder, a clutch means shiftable along said cylinder and having an element expansible to selectively engage the several gears, a multiple plate clutch means in series with said expansible clutch element, an hydraulic piston adapted to load and unload both said clutch elements, and shift means including a cam and hydraulic pressure control means adapted to cut off said pressure, shift said clutch to an adjacent gear, and then restore the hydraulic pressure in the sequence stated.

7. A composite clutch unit for use in connection with a drive means comprising clutch plates, a piston hydraulically actuatable to effect engagement of said clutch plates, an annular clutch element serially connected with said clutch plates, and means operative upon the application of fluid pressure to said piston to radially strain said annular clutch member whereby said annular member is adapted to frictionally engage said drive means.

8. A composite clutch unit for use in connection with a drive means comprising a pair of inner and outer concentric members, clutch plates disposed between said members, a piston actuatable in response to the application of fluid pressure thereto to effect engagement of said plates to provide a driving connection between said members, and means operative in response to said fluid pressure to effect radial extension or contraction of one of said concentric members, whereby said one concentric member is adapted to frictionally engage said drive means.

9. A composite clutch unit comprising a first member, a second member concentric therewith, clutch plates disposed between said members, a piston hydraulically actuatable to engage said clutch plates to provide a driving connection between said members, a third member, generally parallel cones on the adjacent surfaces of said third member and said first member, and a plurality of balls disposed between said cones.

10. A composite clutch unit comprising an inner and an outer concentric member, a multi-plate clutch disposed between said members, a piston hydraulically actuatable to engage said clutch plates to provide a driving connection between said members, a reaction member, generally parallel cones on adjacent surfaces of said reaction member and one of said concentric members, and a plurality of balls disposed between said cones, said conical surfaces being so disposed that upon application of hydraulic pressure to engage said clutch plates said reaction plate is movable to wedge said balls between said cones.

11. A composite clutch unit for use in connection with a drive means comprising a first member, a second member concentric therewith, clutch plates disposed between said members, a piston movable in response to the application of fluid pressure thereto to engage said clutch plates to provide a driving connection between said members, a third member disposed between said concentric members and movable in response to the application of fluid pressure, and means disposed between said third member and said first member and adapted upon application of fluid pressure to radially strain said first member to engage said drive means.

12. In a transmission, a multi-speed gearset, a clutch means of relatively large friction torque capacity, control means adapted to shift said clutch means relative to said gearset for selective frictional engagement therewith, and a second clutch means of relatively large slippage capacity serially connected in said transmission, said two clutch means forming an assembly slidable as a unit.

13. In a multi-speed transmission, a drive member, a plurality of gears disposed in side by side relation and having a bore extending therethrough coaxially with said member, a clutch slidable along said member within said bore and having an annular element radially expansible by hydraulic pressure into engagement with a selected gear, and a composite cam and fluid pressure control operable to sequentially cut off said hydraulic pressure, shift said clutch, and restore said hydraulic pressure.

14. In a multi-speed transmission, a plurality of coaxial gears disposed in side by side relation, a compound clutch unit axially slidable relative to said gears and comprising a clutch having a relatively large slippage capacity serially connected with an annular clutch member having a relatively large clutching torque capacity, common means for loading said large slippage capacity clutch and for circumferentially stressing said annular clutch member into frictional engagement with a selected gear, and means for selectively shifting said compound clutch unit relative to said gears.

15. In a multi-speed transmission, a plurality of coaxial gears disposed in side by side relation, a compound clutch unit axially slidable relative to said gears, said compound clutch unit comprising clutch plates of relatively large slippage capacity serially connected with an annular clutch member having a relatively large clutching torque capacity, fluid pressure means for loading said clutch plates and for circumferentially stressing said annular clutch member into frictional engagement with a selected gear, means for selectively shifting said compound clutch unit relative to said gears, and inertia means adapted to reduce the loading of said clutch plates in order to suppress excessive acceleration.

16. In a multi-speed transmission, a driving member, a driven member, a plurality of coaxial gears disposed in side by side relation and having a bore extending therethrough, said gears being drivably connected to one of said members, the other of said members being coaxial with said gears and extending into said bore in clearance relation thereto, a compound clutch unit slidably splined to said other member and extending into said bore, and means for selectively shifting said compound clutch unit relative to said gears, said compound clutch unit comprising a clutch having relatively large slippage capacity and a serially connected annular clutch element of relatively large clutching torque capacity radially extendible into frictional engagement with a selected gear.

17. In a multi-speed transmission, a driving member, a driven member, a plurality of coaxial gears disposed in side by side relation and having a bore extending therethrough, said gears being drivably connected to one of said members, the other of said members being coaxial with said gears and extending into said bore in clearance relation thereto, an axially slidable compound clutch unit extending into said bore, and means for selectively shifting said clutch unit relative to said gears, said clutch unit comprising an inner member slidably splined to said other member, an outer member concentric with said inner member, clutch plates disposed between said concentric members, a piston hydraulically actuatable to engage said plates and provide a driving connection between said concentric members, and reaction means operable upon application of fluid pressure to said piston to radially extend the adjacent portion of said outer concentric members into frictional engagement with a selected gear.

18. In a transmission, a plurality of gears providing different speed drive ratios, clutch means of relatively large friction torque capacity selectively shiftable relative to said gears for frictional engagement with a selected gear, a second clutch means of relatively large slippage capacity serially connected in said transmission, and a unitary control member operable to first effect disengagement of both said clutch means, then effect selective shift movement of said large torque capacity clutch, and then effect re-engagement of both said clutch means.

19. In a transmission, a plurality of gears providing different speed drive ratios, clutch means of relatively large friction torque capacity selectively shiftable relative to said gears for frictional engagement with a selected gear, a second clutch means of relatively large slippage capacity serially connected in said transmission, and inertia means adapted to control the loading of said second clutch means.

20. In a transmission, a plurality of gears affording different speed drive ratios, a clutch selectively shiftable relative to said gears and operable into engagement with a selected gear upon application of hydraulic pressure to said clutch, and shift means including a cam and hydraulic pressure control means, said shift means being movable from one drive ratio position to another to first cut off hydraulic pressure from said clutch, then shift said clutch to another gear, and then restore the hydraulic pressure to said clutch.

21. In a transmission, a plurality of gears affording different speed drive ratios, a clutch selectively shiftable relative to said gears and operable into engagement therewith upon the application of fluid pressure to said clutch, means connected to said clutch and operative for shifting said clutch, and passage means for the clutch-operating fluid pressure extending through said clutch shifting means.

22. A composite clutch unit comprising a housing member, clutch means disposed within said housing member, and at least a portion of said housing member being radially expansible to provide a clutching surface in series with the clutch means within said housing.

23. In a transmission, a plurality of gears providing different speed drive ratios, clutch means of relatively large friction torque capacity selectively shiftable relative to said gears for frictional engagement with a selected gear, second clutch means of relatively large slippage capacity serially connected in said transmission, and a single member for effecting engagement and disengagement of said clutch means and for effecting shift movement of the large friction torque capacity clutch means.

24. In a transmission, a plurality of gears providing different speed drive ratios, clutch means of relatively large friction torque capacity selectively shiftable relative to said gears for frictional engagement with a selected gear, second clutch means of relatively large slippage capacity serially connected in said transmission, and common means for loading both said clutch means.

25. In a multi-speed transmission, a plurality of co-axial gears disposed in side-by-side relation, a clutch axially slidable relative to said gears and having an annular portion radially strainable into frictional engagement with a selected gear, and means to effect application of a hydraulic pressure within said clutch for radially straining said annular portion.

26. In a multi-speed transmission, a plurality of co-axial gears disposed in side-by-side relation, a clutch axially shiftable relative to said gears and including an annular clutch portion, and means for radially straining said annular portion into frictional engagement with a selected gear, said means comprising a conical member co-axial with said annular portion, roller means between said conical member and annular portion adapted to radially strain said annular portion upon relative axial movement of said conical member and annular portion, and means for applying hydraulic pressure between said clutch and member to effect said relative movement.

ROLAND CHILTON.